United States Patent
Wang et al.

(10) Patent No.: US 11,588,186 B2
(45) Date of Patent: Feb. 21, 2023

(54) BATTERY MODULE, DEVICE, AND FAILURE HANDLING METHOD FOR FAILED BATTERY CELL

(71) Applicant: CONTEMPORARY AMPEREX TECHNOLOGY CO., LIMITED, Ningde (CN)

(72) Inventors: Peng Wang, Ningde (CN); Xingdi Chen, Ningde (CN); Mingdi Xie, Ningde (CN); Linggang Zhou, Ningde (CN); Zhanyu Sun, Ningde (CN); Kai Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/488,497

(22) Filed: Sep. 29, 2021

(65) Prior Publication Data
US 2022/0021033 A1 Jan. 20, 2022

Related U.S. Application Data

(63) Continuation of application No. PCT/CN2020/131573, filed on Nov. 25, 2020.

(30) Foreign Application Priority Data

Nov. 29, 2019 (CN) .......................... 201911205489.5

(51) Int. Cl.
*H01M 10/00* (2006.01)
*H01M 10/42* (2006.01)
(Continued)

(52) U.S. Cl.
CPC .......... *H01M 10/4207* (2013.01); *B60K 1/04* (2013.01); *B60L 50/66* (2019.02); *H01M 50/502* (2021.01);
(Continued)

(58) Field of Classification Search
CPC .......... H01M 10/4207; H01M 50/502; H01M 50/531; H01M 50/564; H01M 2220/20;
(Continued)

(56) References Cited

U.S. PATENT DOCUMENTS 10,622,603 B2  4/2020  Nakai et al.
2009/0035607 A1  2/2009  Nedelec
(Continued)

FOREIGN PATENT DOCUMENTS

CN  1399360 A  2/2003
CN  201270275 Y  7/2009
(Continued)

OTHER PUBLICATIONS

International Search Report and Written Opinion dated Feb. 25, 2021 received in International Application No. PCT/CN2020/131573.
(Continued)

*Primary Examiner* — Nicholas P D'Aniello
(74) *Attorney, Agent, or Firm* — Scully Scott Murphy & Presser (57) ABSTRACT

A battery module, a device, and a failure handling method for a failed battery cell. The battery module includes: a battery cell arrangement structure, including a plurality of battery cells arranged along a length direction, where the battery cells include electrode terminals, and the battery cells include a failed battery cell; a box body, having an accommodation cavity in which the battery cell arrangement structure is located; a mounting beam, located in the accommodation cavity and at an end of the battery cell arrangement structure along the width direction; a pressing plate; and a conductive component, connected to a positive electrode terminal and a negative electrode terminal of the failed battery cell. The conductive component is easily connected (Continued)

to electrode terminals of a failed battery cell, so that a maintenance process can be simplified and maintenance costs can be reduced.

10 Claims, 8 Drawing Sheets

(51) Int. Cl.
  *B60L 50/60* (2019.01)
  *H01M 50/502* (2021.01)
  *H01M 50/531* (2021.01)
  *H01M 50/564* (2021.01)
  *B60K 1/04* (2019.01)
(52) U.S. Cl.
  CPC ....... *H01M 50/531* (2021.01); *H01M 50/564* (2021.01); *B60K 2001/0438* (2013.01); *H01M 2220/20* (2013.01)
(58) Field of Classification Search
  CPC .. H01M 10/42; H01M 50/264; H01M 50/505; H01M 50/514; H01M 50/209; B60K 1/04; B60K 2001/0438; B60L 50/66; Y02E 60/10
  See application file for complete search history.

(56) References Cited

U.S. PATENT DOCUMENTS

| 2010/0112424 | A1* | 5/2010 | Hayashi | H01M 50/271 |
| | | | | 429/99 |
| 2012/0293016 | A1 | 11/2012 | Schaefer et al. | |
| 2013/0244068 | A1* | 9/2013 | Kuroda | B60R 16/04 |
| | | | | 429/82 |
| 2014/0127540 | A1 | 5/2014 | Min | |
| 2016/0218388 | A1* | 7/2016 | Kim | H01M 50/20 |
| 2018/0175640 | A1 | 6/2018 | Lee | |
| 2018/0309101 | A1 | 10/2018 | Nakai et al. | |
| 2021/0137441 | A1* | 5/2021 | Stankus | A61B 5/352 |
| 2021/0249731 | A1* | 8/2021 | You | H01M 50/209 |
| 2022/0021034 | A1* | 1/2022 | Wang | B60L 58/21 |

FOREIGN PATENT DOCUMENTS

| CN | 101567436 A | 10/2009 |
| CN | 102292848 A | 12/2011 |
| CN | 102447089 A | 5/2012 |
| CN | 102483046 A | 5/2012 |
| CN | 202395111 U | 8/2012 |
| CN | 203367395 U | 12/2013 |
| CN | 204441373 U | 7/2015 |
| CN | 105024107 A | 11/2015 |
| CN | 107039688 A | 8/2017 |
| CN | 107431254 A | 12/2017 |
| CN | 108140761 A | 6/2018 |
| CN | 108448021 A | 8/2018 |
| CN | 208570760 U | 3/2019 |
| CN | 109920952 A | 6/2019 |
| CN | 209447876 U | 9/2019 |
| CN | 209447949 U | 9/2019 |
| DE | 10 2007 017 018 A1 | 3/2008 |
| DE | 102012210151 A1 | 12/2013 |
| GB | 1359747 A | 7/1974 |
| JP | 2000133318 A | 5/2000 |
| JP | 2003132873 A | 5/2003 |
| JP | 2005-283516 A | 10/2005 |
| JP | 2008034183 A | 2/2008 |
| KR | 101382279 B1 | 4/2014 |
| KR | 20160091124 A | 8/2016 |

OTHER PUBLICATIONS

Notice of Reasons for Refusal dated Nov. 14, 2022 received in Japanese Patent Application No. JP 2022-530972.
Notice of Preliminary Rejection dated Nov. 29, 2022 received in Korean Patent Application No. KR 10-2022-7017272.

* cited by examiner

BATTERY MODULE, DEVICE, AND FAILURE HANDLING METHOD FOR FAILED BATTERY CELL

CROSS-REFERENCE TO RELATED APPLICATIONS

The present application is a continuation of International Application No. PCT/CN2020/131573, filed on Nov. 25, 2020, which claims priority to Chinese Patent Application No. CN201911205489.5, filed to the Chinese Patent Office on Nov. 29, 2019 and entitled "BATTERY MODULE, DEVICE, AND FAILURE HANDLING METHOD FOR FAILED BATTERY CELL", both of which are incorporated herein by reference in their entireties.

TECHNICAL FIELD

This application relates to the technical field of energy storage devices, and in particular, to a battery module, a device, and a failure handling method for a failed battery cell.

BACKGROUND

A battery module includes a plurality of battery cells that are stacked, and the plurality of battery cells are electrically connected, to output electric energy of the battery module for supplying power to electrical appliances. There is a risk of failure when the battery cells are charged and discharged. The failure of one battery cell may cause the entire circuit of the battery module to fail, making the battery module unable to function properly. Currently, when a battery cell fails, usually the entire battery module is replaced. However, when one battery cell of the battery module fails, other battery cells can still function properly, so the method of directly replacing the entire battery module causes a waste of resources. In addition, it takes a long time to remove and install the battery module, which reduces work efficiency.

SUMMARY

This application provides a battery module, a device, and a failure handling method for a failed battery cell, which can simplify a maintenance process of the battery module, reduce maintenance costs, and improve work efficiency (utilization) of the battery module.

According to a first aspect, an embodiment of this application provides a battery module, where the battery module includes: a battery cell arrangement structure, including a plurality of battery cells arranged along a length direction, where the battery cell includes electrode terminals, the electrode terminals are arranged along the length direction and face toward a width direction of the battery module, and the battery cells include a failed battery cell; a box body, where the box body includes an accommodation cavity in which the battery cell arrangement structure is located; a mounting beam, where the mounting beam is located in the accommodation cavity and at an end of the battery cell arrangement structure along the width direction, and along a height direction of the battery module, the mounting beam includes a second upper end surface; a pressing plate, where at least part of the pressing plate is located at an end of the battery cell arrangement structure along the height direction, and the pressing plate is detachably connected to the mounting beam; and a conductive component, where the conductive component is connected to a positive electrode terminal and a negative electrode terminal of the failed battery cell, and along the height direction, at least part of the conductive component is located between the second upper end surface and an uppermost portion of the pressing plate.

Therefore, when one battery cell or some battery cells fail during operation of the battery module, it is only required to connect positive and negative electrode terminals of the failed battery cell through the conductive component, instead of repairing or replacing the entire battery module. Moreover, after the foregoing handling, a relatively small current goes through the failed battery cell, so that a battery capacity of the battery module may not decrease sharply, and the battery module can function properly.

Moreover, when at least part of the conductive component is located above the mounting beam, the conductive component is easily connected to the electrode terminals of the failed battery cell, which means that, there is no need to remove the mounting beam and also no need to remove the battery cell arrangement structure out of the accommodation cavity, so that a maintenance process can be further simplified and maintenance costs can be reduced.

In a possible design, the pressing plate includes a body part and a connecting part. The body part is located at an end of the battery cell arrangement structure along the width direction. One end of the connecting part is connected to the body part, and the other end of the connecting part is detachably connected to the mounting beam.

When the connecting part of the pressing plate is detachably connected to the mounting beam, not only the pressing plate can be mounted on the mounting beam to improve stability of the battery cells in the accommodation cavity, but also the connecting part can be easily removed from the mounting beam, to facilitate connecting the conductive component.

In a possible design, along the height direction, the battery cells on the uppermost layer have a first upper end surface, and the body part is connected to the first upper end surface. The first upper end surface is higher than the second upper end surface. The connecting part includes a first connecting section, a second connecting section and a transition section. The transition section connects the first connecting section and the second connecting section. The first connecting section is connected to the body part, or the first connecting section is connected to the body part and the first upper end surface. The second connecting section is detachably connected to the second upper end surface.

Based on the foregoing connection manner, connection reliability between the connecting part and the battery cells and between the connecting part and the body part is high.

In a possible design, the battery cell includes a top cover plate, and the electrode terminals are disposed on the top cover plate. Along the width direction, there is a preset distance between the top cover plate and the mounting beam. When the pressing plate is connected to the mounting beam, the box body, the mounting beam, and the pressing plate enclose an accommodation space, and the conductive component is located in the accommodation space.

The preset distance between the top cover plate and the mounting beam is used to provide an electrical gap between the electrode terminals of the battery cells and the mounting beam, thereby avoiding electrical connection between the battery cells and the mounting beam and ensuring that the battery module can function properly. Moreover, the box body, the mounting beam, and the pressing plate enclose the accommodation space, which can facilitate the connection of the conductive component.

In a possible design, the body part is bonded to the first upper end surface. The first connecting section is overlapped with the body part, and an overlapped length of the two is 10 millimeter (mm) to 200 millimeter (mm).

With an overlapped length range set, when the overlapped length is relatively large, connection reliability between the connecting part and the body part is high.

In a possible design, along the width direction, the battery module includes one battery cell arrangement structure, and along the width direction, the body part is within the battery cell arrangement structure. Alternatively, along the width direction, the battery module includes two battery cell arrangement structures, and electrode terminals of the two battery cell arrangement structures are facing away from each other. Along the width direction, one end of the body part is within one battery cell arrangement structure, and the other end of the body part is within the other battery cell arrangement structure.

In this way, when a conductive component is to be connected, the body part may not affect the operation for connecting the conductive component even if the body part is not removed.

In a possible design, the battery module further includes a first adapting piece and a second adapting piece. The first adapting piece and the second adapting piece are connected to the electrode terminals of the battery cells. The conductive component is connected to the first adapting piece and the second adapting piece that are connected to the failed battery cell. Along the height direction, at least part of the first adapting piece and part of the second adapting piece are located between the second upper end surface and an uppermost portion of the pressing plate.

For the first adapting piece and the second adapting piece that are connected to the electrode terminals of the failed battery cell, when at least part of the first adapting piece and part of the second adapting piece are located above the second upper end surface of the mounting beam, the conductive component can be easily connected to the first adapting piece and the second adapting piece. Compared with the case where the conductive component is directly connected to the electrode terminals, when the conductive component is connected to the adapting pieces, a contact area between the conductive component and an adapting piece is relatively large, so that a current flowing area between the two can be increased, and a risk of overheating at the connection locations can be reduced.

In a possible design, along the height direction, a location for connecting the conductive component and the first adapting piece is between the second upper end surface and the pressing plate, and a location for connecting the conductive component and the second adapting piece is between the second upper end surface and an uppermost portion of the pressing plate.

The location for connecting the conductive component and the first adapting piece and the location for connecting the conductive component and the second adapting piece are above the second upper end surface of the mounting beam, so that the conductive component can be easily connected to the first adapting piece and the second adapting piece.

In a possible design, the battery cell arrangement structure includes a first battery cell arrangement structure and a second battery cell arrangement structure, and along the height direction, the first battery cell arrangement structure is located above the second battery cell arrangement structure. The first adapting piece connects a battery cell of the first battery cell arrangement structure and a battery cell of the second battery cell arrangement structure, and the second adapting piece connects a battery cell of the first battery cell arrangement structure and a battery cell of the second battery cell arrangement structure.

In this connection manner, for the first adapting piece and the second adapting piece that are connected to the battery cells of the second battery cell arrangement structure in the lower layer, at least part of the first adapting piece and part of the second adapting piece are located above the second upper end surface of the mounting beam, so that the first adapting piece and the second adapting piece can be connected by using the conductive component. To be specific, in this connection manner, the battery module includes two layers of battery cell arrangement structures. When a battery cell of the second battery cell arrangement structure in the lower layer fails, the failed battery cell (located in the lower layer) can also be connected by using the conductive component, so that the failed battery cell can still be maintained without removing the battery cell arrangement structure.

According to a second aspect, an embodiment of this application provides a device using battery cells as a power supply, where the device includes: a power source, the power source being configured to provide driving force for the device, and the battery module as described above, configured to supply electric energy to the power source.

When one battery cell or some battery cells fail during operation of the battery module, the device only need to connect electrode terminals of a failed battery cell by using a conductive component, without need to repair or replace the entire battery module. When the device is a vehicle, this enables the vehicle to be repaired directly in a 4S shop, without need to return the vehicle to the factory for handling, or without need to replace the battery module with a new battery module, thereby improving work efficiency of the battery module, simplifying a maintenance process, and reducing maintenance costs.

According to a third aspect, an embodiment of this application provides a failure handling method for a failed battery cell, where a battery cell arrangement structure includes a plurality of battery cells, the battery cells include a failed battery cell, the failed battery cell includes a positive electrode terminal and a negative electrode terminal, a mounting beam is provided at an end of the battery cell arrangement structure along a width direction, and a pressing plate is provided at an end of the battery cell arrangement structure along a height direction. The failure handling method includes: removing at least part of the pressing plate from the mounting beam; and electrically connecting a positive electrode terminal and a negative electrode terminal of the failed battery cell by using the conductive component.

Based on the foregoing method, when one battery cell or some battery cells fail during operation of the battery module, it is only required to connect the positive and negative electrode terminals of the failed battery cell by using the conductive component, without need to repair or replace the entire battery module.

In a possible design, the pressing plate includes a body part and a connecting part, and when at least part of the pressing plate is to be removed from the mounting beam, the failure handling method includes: removing the connecting part from the mounting beam.

During maintenance of a failed battery cell, there is no need to remove the entire pressing plate. At least part of the failed battery cell can be exposed by only removing the connecting part, and therefore, the maintenance can be performed conveniently.

In a possible design, the two electrode terminals of the failed battery cell are connected to a first adapting piece and a second adapting piece respectively, and when the positive electrode terminal and the negative electrode terminal of the failed battery cell are to be connected by using the conductive component, the failure handling method includes: electrically connecting, by using the conductive component, the first adapting piece and the second adapting piece that are connected to the failed battery cell.

The two electrode terminals of the failed battery cell are indirectly connected by using the conductive component, so that the failed battery cell is short-circuited. In addition, when the conductive component is connected to the two adapting pieces, a contact area between the conductive component and an adapting piece is relatively large, so that a current flowing area between the two can be increased, and a risk of overheating at the connection locations between the conductive component and the adapting pieces can be reduced.

In a possible design, after the positive electrode terminal and the negative electrode terminal of the failed battery cell are electrically connected by using the conductive component, the failure handling method further includes: mounting the at least part of the pressing plate that was removed from the mounting beam back to the mounting beam.

After the removed connecting part is re-mounted to the mounting beam, the maintenance of the failed battery cell is completed. In the battery module, the battery cell arrangement structure(s) may also be limited by the pressing plate and the mounting beam.

It should be understood that the foregoing general description and the following detailed description are only exemplary and are not intended to limit this application.

Reference signs are described as follows:
D. device;
M. battery module;
  1. battery cell arrangement structure:
    11. first battery cell arrangement structure:
    12. second battery cell arrangement structure;
    13. battery cell;
      131. electrode terminal;
        131a. positive electrode terminal;
        131b. negative electrode terminal;
      132. first upper end surface:
      133. failed battery cell;
      134. top cover plate;
  2. first adapting piece;
  3. second adapting piece;
  4. pressing plate:
    41. body part:
    42. connecting part;
      421. first connecting section:
      422. second connecting section;
      423. transition section;
      424. pressing block:
  5. box body;
    51. accommodation cavity:
    52. mounting beam;
      521. second upper end surface;
    53. accommodation space:
  6. conductive component;
    61. matching slot;
      611. side wall; and
      612. upper wall.

The accompanying drawings herein are incorporated into this specification and form a part of this specification, illustrate the embodiments conforming to this application, and are intended to explain the principles of this application together with the specification.

DESCRIPTION OF EMBODIMENTS

To help better understand the technical solutions of this application, the following describes the embodiments of this application with reference to accompanying drawings.

Apparently, the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The terms "a/an", "the" and "this" of singular forms used in the embodiments and the appended claims of this application are also intended to include plural forms, unless otherwise specified in the context clearly.

It should be understood that in this specification, a term "and/or" is only an associative relationship for describing associated objects, indicating that three relationships may exist. For example, A and/or B may indicate three situations: A exists independently; A and B exist simultaneously; and B exists independently. In addition, a character "/" in this specification generally indicates an "or" relationship between contextually associated objects.

It should be noted that the directional terms such as "up", "down", "left", and "right" described in the embodiments of this application are described as seen from the angles shown in the accompanying drawings, and should not be understood as a limitation to the embodiments of this application In addition, in the context, it should be further understood that w % ben an element is referred to as being "above" or "under" another element, the element can not only be directly connected "above" or "under" the another element, but also be indirectly connected "above" or "under" the another element through an intermediate element.

An embodiment of this application provides a device D using battery cells 13 as a power supply, and a battery module M. The device D using battery cells 13 as a power supply includes a vehicle, a ship, a small aircraft, and other mobile devices. The device D includes a power source, and the power source is configured to provide driving force for the device D, and the power source may be configured as the battery module M supplying electric energy to the device D. The driving force of the device D may be only electric energy, or may include electric energy and another energy source (such as mechanical energy). The power source may be a battery module M, or may be a battery module M and an engine. Therefore, any device D that can use battery cells 13 as a power supply falls within the protection scope of this application.

Figure 1:
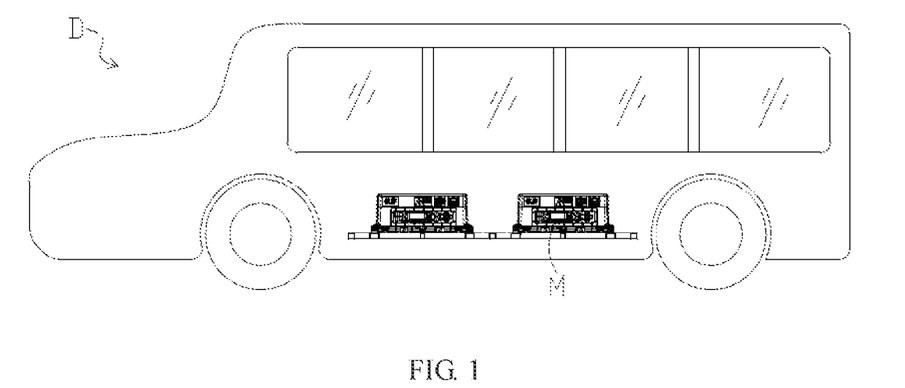
FIG. 1 is a schematic structural diagram of a device according to a specific embodiment of this application.

As shown in FIG. 1, using a vehicle as an example, the device D in this embodiment of this application may be a new energy vehicle, which may be a battery electric vehicle, or may be a hybrid electric vehicle or an extended-range electric vehicle. The vehicle may include a battery module M and a vehicle body. The battery module M is disposed in the vehicle body. The vehicle body is also provided with a drive motor, and the drive motor is electrically connected to the battery module M. The battery module M provides electric energy to the drive motor. The drive motor is connected to wheels on the vehicle body through a transmission mechanism to drive travel of the vehicle. Specifically, the battery module M may be horizontally disposed at the bottom of the vehicle body.

Figure 2:
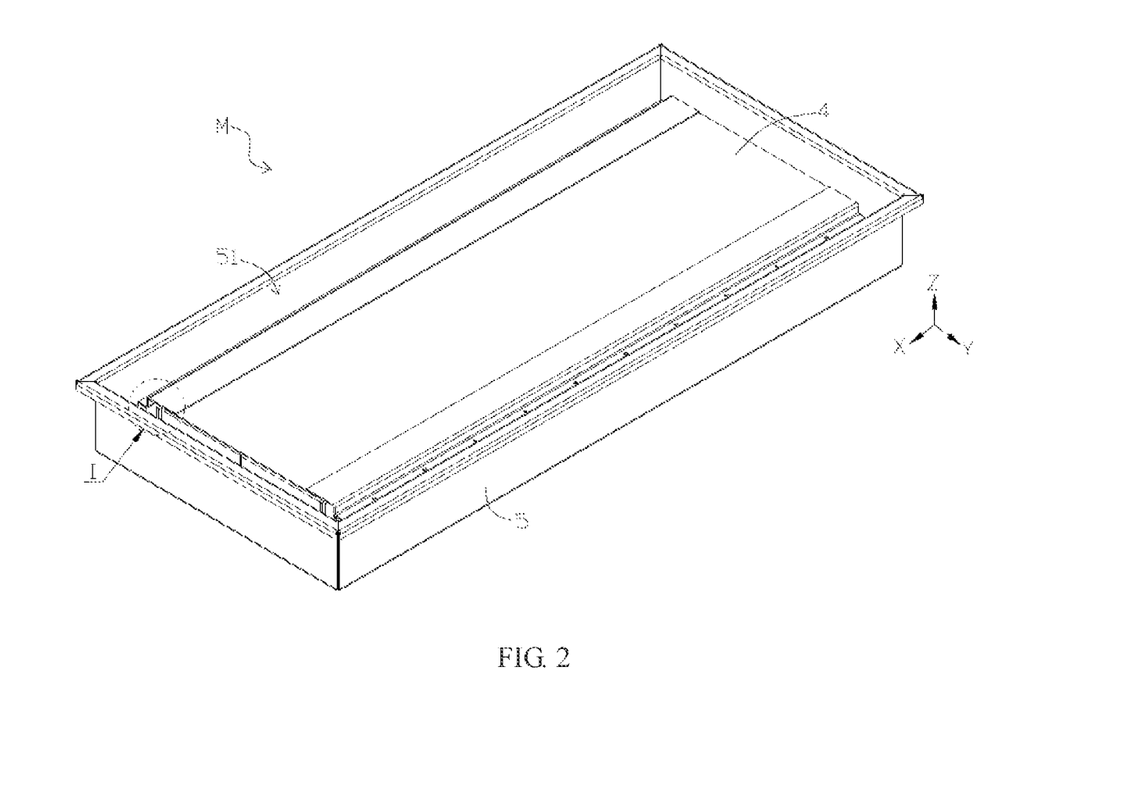
FIG. 2 is a schematic structural diagram of a battery module shown in FIG. 1 according to a specific embodiment, where a pressing plate is connected to a mounting beam.

As shown in FIG. 2, the battery module M may include a box body 5 (the box body 5 shown in FIG. 2 is a structure with a top cover plate omitted), and the box body 5 includes an accommodation cavity 51. The accommodation cavity 51 is used to place battery cells 13 (see FIG. 4), and a plurality of battery cells 13 are stacked inside the accommodation cavity 51. The box body 5 is not limited to a specific type, and may be frame-shaped, disk-shaped, or box-shaped. Specifically, in the embodiment shown in FIG. 2, the box body 5 may be a box body 5 with a rectangular structure.

Figure 4:
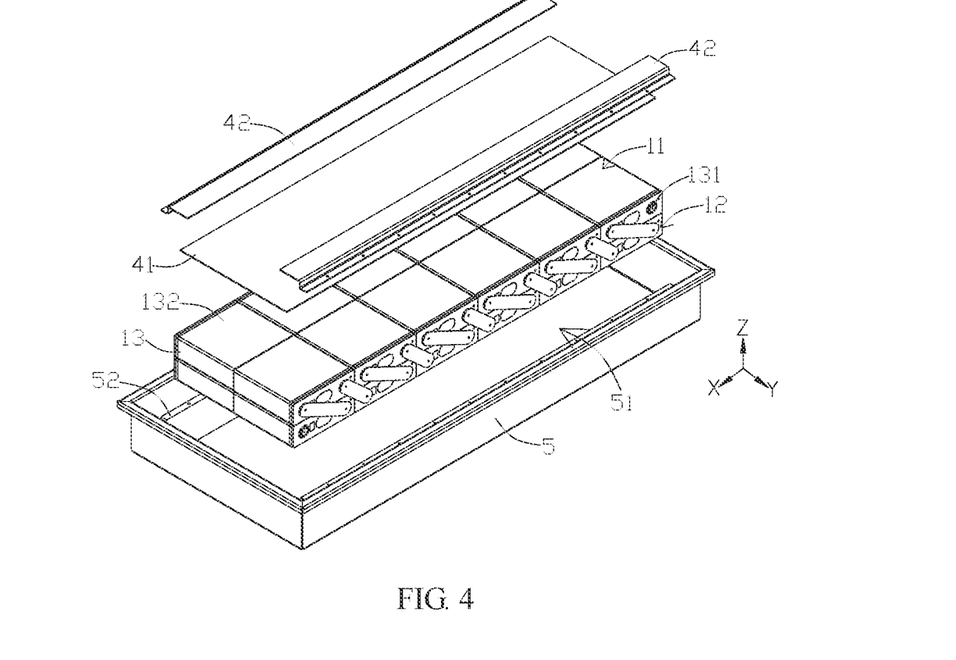
FIG. 4 is an exploded view of FIG. 2.
Figure 10:
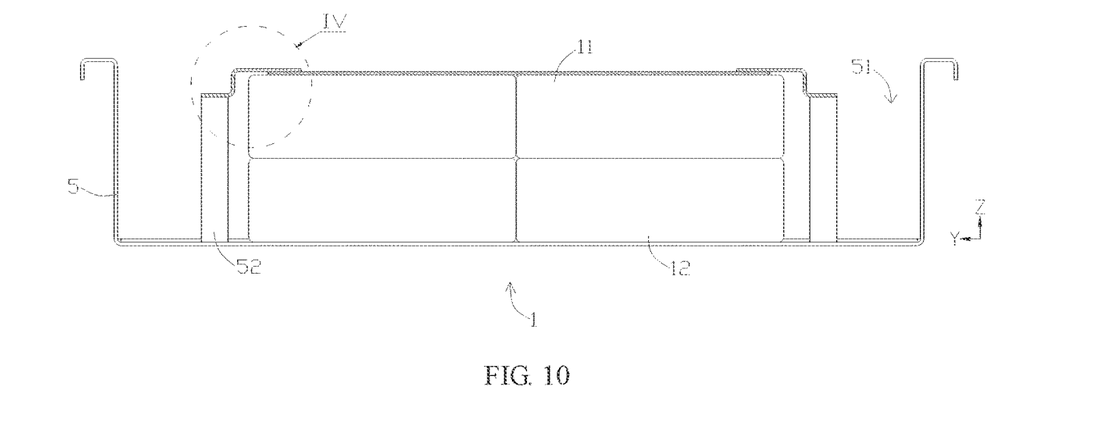
FIG. 10 is a sectional view of FIG. 3.

More specifically, as shown in FIG. 4, the battery module M includes one or more battery cell arrangement structures 1 (see FIG. 10). The battery cell arrangement structure 1 includes a plurality of battery cells 13 arranged along a length direction X, which means that in the battery cell arrangement structure 1, electrode terminals 131 of the battery cells 13 are arranged along the length direction X and face toward a width direction Y. The width direction Y refers to a width direction Y of the battery module M. Moreover, along the width direction Y, the battery module M may include one battery cell arrangement structure 1, or may include two battery cell arrangement structures 1. When the battery module M includes two battery cell arrangement structures 1, electrode terminals 131 of battery cells 13 in the two battery cell arrangement structures 1 are facing away from each other, and bottoms of the two battery cell arrangement structures are close to each other. To be specific, electrode terminals 131 of battery cells 13 in one battery cell arrangement structure 1 face toward one orientation of the width direction Y, electrode terminals 131 of battery cells 13 in another battery cell arrangement structure 1 face toward the other orientation of the width direction Y, and the two battery cell arrangement structures 1 are close to or abut against each other along the width direction Y.

Moreover, along a height direction Z, the battery module M may include one layer of battery cell arrangement structure 1, or may include two layers of battery cell arrangement structures 1. Each layer may include two battery cell arrangement structures 1 arranged along the width direction Y. In the embodiment shown in FIG. 4, the battery module M includes two layers of battery cell arrangement structures 1, namely, a first battery cell arrangement structure 11 and a second battery cell arrangement structure 12 which are stacked along the height direction Z.

Figure 9:
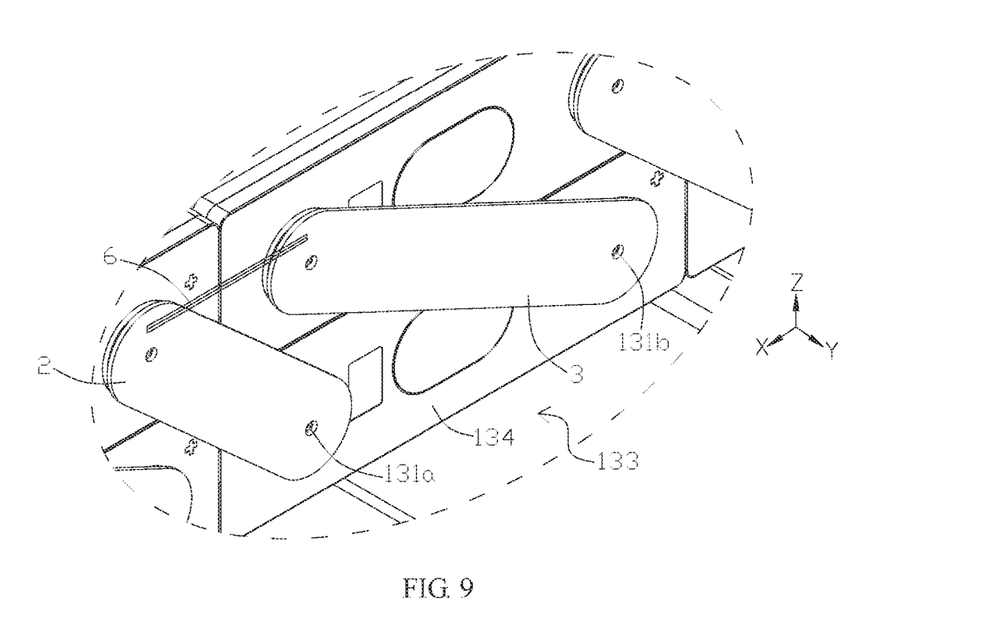
FIG. 9 is a locally enlarged view of part III in FIG. 8.

Moreover, each battery cell 13 includes a positive electrode terminal 131a and a negative electrode terminal 131b (see FIG. 9). In the battery module M, a plurality of battery cells 13 are electrically connected to form a circuit of the battery module M. Specifically, the battery cells 13 may be connected in series and/or parallel, and the battery cells 13 are connected by using adapting pieces (a first adapting piece 2 and a second adapting piece 3). For example, when the battery cells 13 are connected in series, the positive electrode terminal 131a of one battery cell 13 and the negative electrode terminal 131b of another battery cell 13 are connected by using an adapting piece.

During the operation of the battery module M, the battery cells 13 are continuously charged and discharged, and during the charging and discharging, the battery cells 13 are at a risk of failure (such as thermal runaway), causing a battery cell 13 unable to function properly. In this case, the battery cell 13 failed due to a failure, that is the failed battery cell 133 (see FIG. 7), causes the circuit of the battery module M to fail and unable to supply power normally. In this application, the technical problem is resolved by short-circuiting the failed battery cell 133 to form a new circuit.

Figure 5:
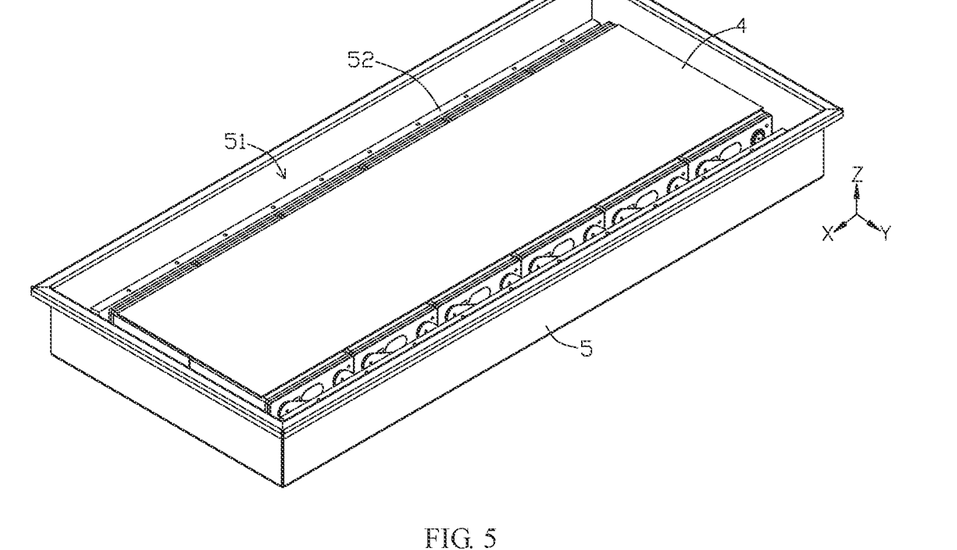
FIG. 5 is a schematic structural diagram of the connecting part in FIG. 2 with the pressing plate removed.
Figure 6:
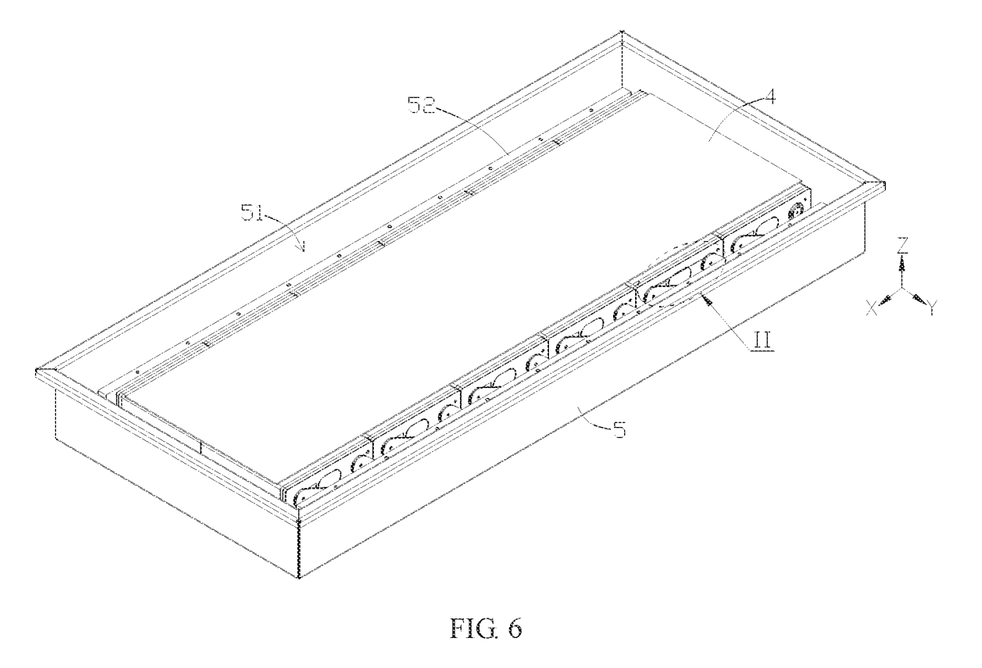
FIG. 6 is a schematic structural diagram of a first adapting piece and a second adapting piece connected by using a conductive component shown in FIG. 5.

Specifically, as shown in FIGS. 4 to 6, the box body 5 of the battery module M further includes a mounting beam 52. The mounting beam 52 is located inside the accommodation cavity 51 of the box body 5, and at an end of the battery cell arrangement structure 1 along the width direction Y, which means that electrode terminals 131 of the battery cell arrangement structure 1 face toward the mounting beam 52. Moreover, the battery module M further includes a pressing plate 4. At least part of the pressing plate 4 is located at an end of the battery cell arrangement structure 1 along the height direction Z, and the pressing plate 4 is detachably connected to the mounting beam 52. After the pressing plate 4 is connected to the mounting beam, the pressing plate 4 can be used to limit the battery cell arrangement structure 1 along the height direction Z, thereby improving stability of the battery cell arrangement structure 1 inside the accommodation cavity 51.

Moreover, the battery module M further includes a conductive component 6. When a battery cell 13 has failed and a failed battery cell 133 occurs, the conductive component 6 is configured to directly or indirectly connect a positive electrode terminal 131a and a negative electrode terminal 131b of the failed battery cell 133. The conductive component 6 may be connected to the electrode terminals 131 of the failed battery cell 133 inside the failed battery cell 133, or may be connected to the electrode terminals 131 of the failed battery cell 133 outside the failed battery cell 133. The conductive component 6 may be directly connected to the electrode terminals 131 of the failed battery cell 133, or, when the electrode terminals 131 are connected to the adapting pieces, the conductive component 6 may be connected to the adapting pieces that are connected to the electrode terminals 131. Therefore, a short circuit between the positive electrode terminal 131a and the negative electrode terminal 131b of the failed battery cell 133 can be implemented by using the conductive component 6, so that the failed battery cell 133 is removed from the charge and discharge circuit of the battery module M.

In addition, the battery cell 13 in the embodiments of this application may be a soft package battery, or may be a square battery or a cylindrical battery. Accordingly, the electrode terminals 131 (including the positive electrode terminal 131a and the negative electrode terminal 131b) of the battery cell 13 may be electrode terminals 131 the soft package battery, or may be electrode terminals 131 of the square battery or the cylindrical battery. Moreover, when an electrode pole and a tab of the battery cell 13 are connected by using an adapting piece, the electrode terminal 131 may alternatively be a structure connected to the electrode pole and the adapting piece.

Therefore, when one battery cell 13 or some battery cells 13 fail during operation of the battery module M, it is only required to connect the positive and negative electrode terminals 131 of the failed battery cell 133 by using the conductive component 6, without need to replace the entire battery module M. When the battery module M is used in a vehicle, in case that one battery cell or some battery cells 13 fail, the vehicle can be repaired directly in a 4S shop, without need to return the vehicle to the factory for handling, or without need to replace the battery module M with a new battery module M, thereby improving maintenance efficiency and work efficiency (utilization) of the battery module M, simplifying a maintenance process, and reducing maintenance costs. Moreover, after the foregoing handling, a relatively small current goes through the failed battery cell 133, which may not cause a significant reduction of the battery capacity of the battery module M, so that the battery module M can function properly.

In addition, for a structure in which the battery cell 13 is attached to the accommodation cavity 51 of the box body 5 through a structural adhesive, when a specific battery cell 13 fails, it is not easy to implement an operation for removing the failed battery cell 133 from the accommodation cavity 51. Therefore, in this embodiment, the handling method of short-circuiting the failed battery cell 133 by using the conductive component 6 has the advantages of convenient operation and high efficiency.

Figure 7:
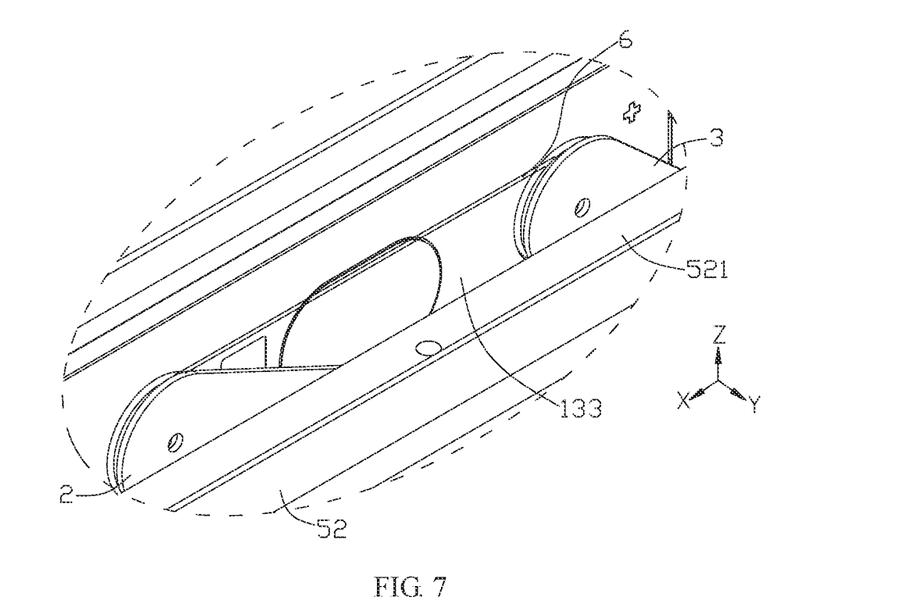
FIG. 7 is a locally enlarged view of part II in FIG. 6.

Moreover, for the battery module M shown in FIG. 6 and FIG. 7, along the height direction Z of the battery module M, at least part of the conductive component 6 is located between the mounting beam 52 and an uppermost portion of the pressing plate 4, where the uppermost portion of the pressing plate 4 refers to a portion at which the pressing plate 4 has a highest height along the height direction (based on a same plane, for example, based on a bottom surface of the box body 5 of the battery module M).

Figure 11:
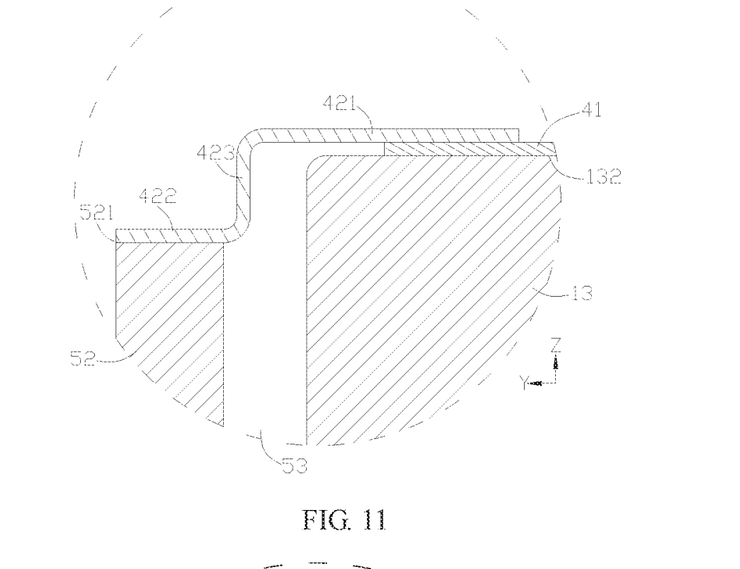
FIG. 11 is a locally enlarged view of part IV in FIG. 10 according to a first specific embodiment.
Figure 12:
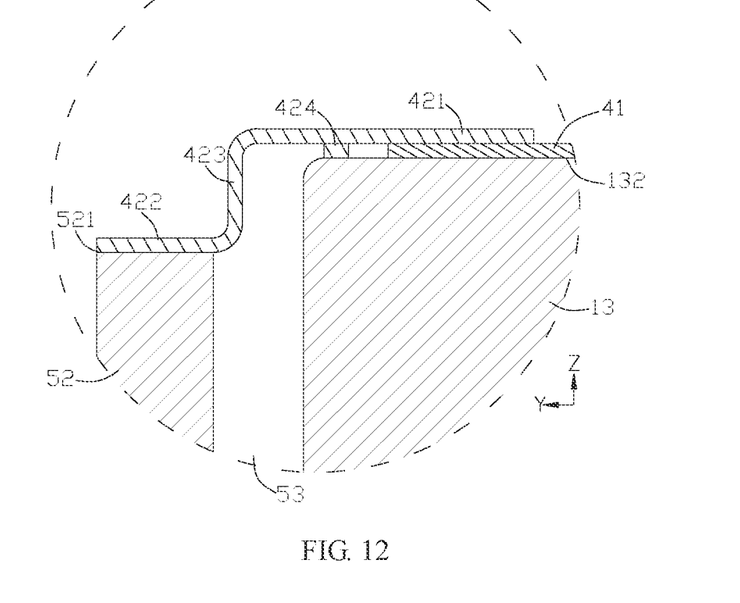
FIG. 12 is a locally enlarged view of part IV in FIG. 10 according to a second specific embodiment.

Using the embodiments shown in FIG. 4, FIG. 11 and FIG. 12 as an example, the pressing plate 4 includes a body part 41 and a connecting part 42, where the body part 41 is a flat plate structure (the height is the same everywhere), and the connecting part 42 may include a first connecting section 421, a second connecting section 422, and a transition section 423. Along the width direction Y, the transition section 423 connects the first connecting section 421 and the second connecting section 422, the first connecting section 421 is connected to the body part 41, and the second connecting part 422 is connected to the mounting beam 52. Therefore, the first connecting section 421 is higher than the second connecting section 422 in height. The transition section 423 extends along the height direction Z, so that a cross section of the connecting part 42 is generally Z-shaped. The connecting part 42 with such a structure can facilitate to connecting the mounting beam 52 and the body part 41.

The first connecting section 421 of the connecting part 42 overlaps on top of the body part 41. In this case, the uppermost portion of the pressing plate 4 is the first connecting section 421. Therefore, in this embodiment, along the height direction Z, at least part of the conductive component 6 is located between the second upper end surface 521 of the mounting beam 52 and the first connecting section 421 of the pressing plate 4, that is, located above the second upper end surface 521 (not necessarily in contact with the second upper end surface 521) and below the first connecting section 421 (not necessarily in contact with the first connecting section 421). There may be no connection between the conductive component 6 and the mounting beam 52 and between the conductive component 6 and the pressing plate 4, or the conductive component 6 and the mounting beam 52 are connected and insulated by using another component, and the conductive component 6 and the first connecting section 421 are connected and insulated by using another component.

In this embodiment, when at least part of the conductive component 6 is located above the second upper end surface 521, the conductive component 6 is easily connected to or disconnected from electrode terminals 131 of the failed battery cell 133, which means that, there is no need to remove the mounting beam 52 and also no need to remove the battery cell arrangement structure 1 from the accommodation cavity 51, so that a maintenance process can be further simplified and maintenance costs can be reduced.

Specifically, as shown in FIG. 6 and FIG. 7, the battery module M further include a first adapting piece 2 and a second adapting piece 3. The first adapting piece 2 and the second adapting piece 3 are connected to the electrode terminals 131 of the battery cells 13. The conductive component 6 is connected to the first adapting piece 2 and the second adapting piece 3 that are connected to the failed battery cell 133, which means that in this embodiment, the conductive component 6 can be connected to two electrode terminals 131 of the failed battery cell 133 indirectly. Moreover, after the connection done, along the height direction Z, at least part of the first adapting piece 2 and part of the second adapting piece 3 are located between the mounting beam 52 and the uppermost portion of the pressing plate 4.

In this embodiment, for the first adapting piece 2 and the second adapting piece 3 that are connected to the electrode terminals 131 of the failed battery cell 133, when at least part of the first adapting piece 2 and part of the second adapting piece 3 are located above the second upper end surface 521 of the mounting beam 52, the conductive component 6 can be easily connected to the first adapting piece 2 and the second adapting piece 3. Compared with the case where the conductive component 6 is directly connected to the electrode terminals 131, when the conductive component 6 is connected to the adapting pieces, a contact area between the conductive component 6 and an adapting piece is relatively large, so that a current flowing area between the two can be increased, and a risk of overheating at the connection locations can be reduced.

More specifically, along the height direction Z, a location for connecting the conductive component 6 and the first adapting piece 2 is between the mounting beam 52 and the pressing plate 4, and a location for connecting the conductive component 6 and the second adapting piece 3 is between the mounting beam 52 and an uppermost portion of the pressing plate 4. To be specific, the location for connecting the conductive component 6 and the first adapting piece 2 and the location for connecting the conductive component 6 and the second adapting piece 3 are above the second upper end surface 521 of the mounting beam 52, so that the conductive component 6 can be easily connected to the first adapting piece 2 and the second adapting piece 3.

As shown in FIG. 9, FIG. 11, and FIG. 12, the battery cell 13 includes a top cover plate 134, and the electrode terminals 131 are disposed on the top cover plate 134. Along the width direction Y, there is a preset distance between the top cover plate 134 and the mounting beam 52, and the preset distance is used to provide an electrical gap between the electrode terminals 131 of the battery cells 13 and the mounting beam 52, thereby avoiding electrical connection between the battery cells 13 and the mounting beam 52 and ensuring that the battery module M can function properly.

Moreover, when the pressing plate 4 is connected to the mounting beam 52, the box body 5, the mounting beam 52, and the pressing plate 4 enclose an accommodation space 53, and the conductive component 6 is located in the accommodation space 53. With the accommodation space 53, the conductive component 6 can be easily connected to the first adapting piece 2 and the second adapting piece 3.

Figure 13:
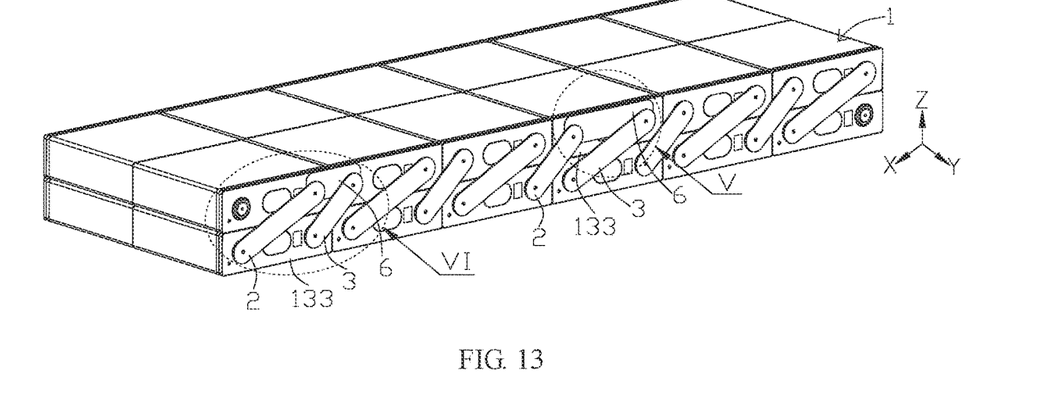
FIG. 13 is a schematic structural diagram of a battery cell arrangement structure in the battery module shown in FIG. 2 according to another specific embodiment.
Figure 14:
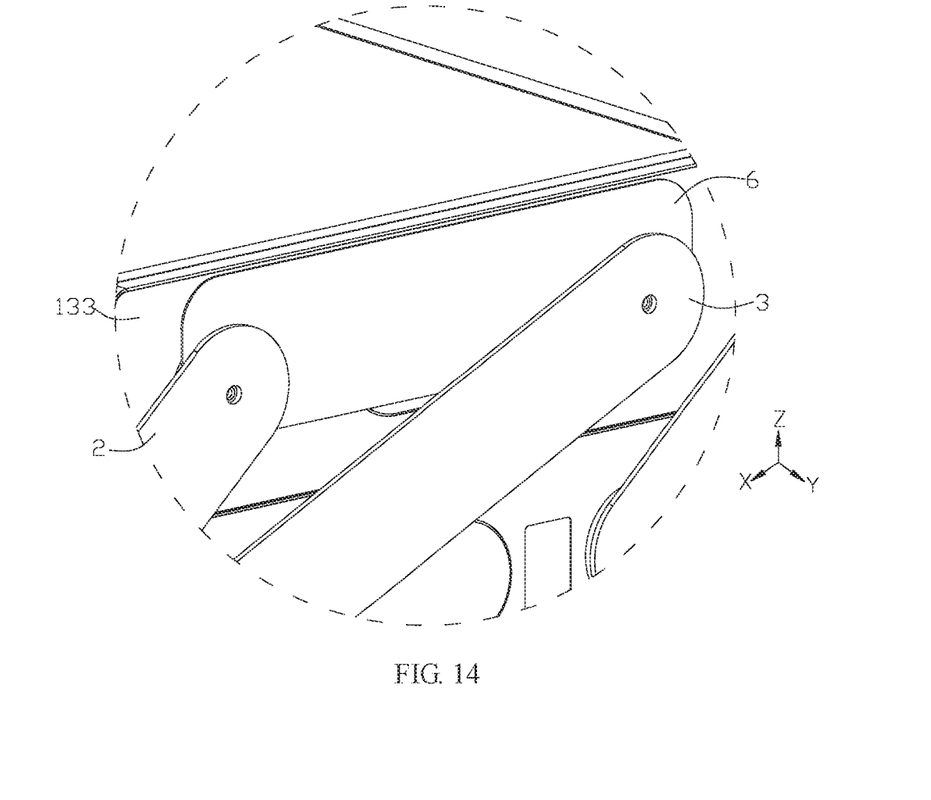
FIG. 14 is a locally enlarged view of part V in FIG. 13.
Figure 15:
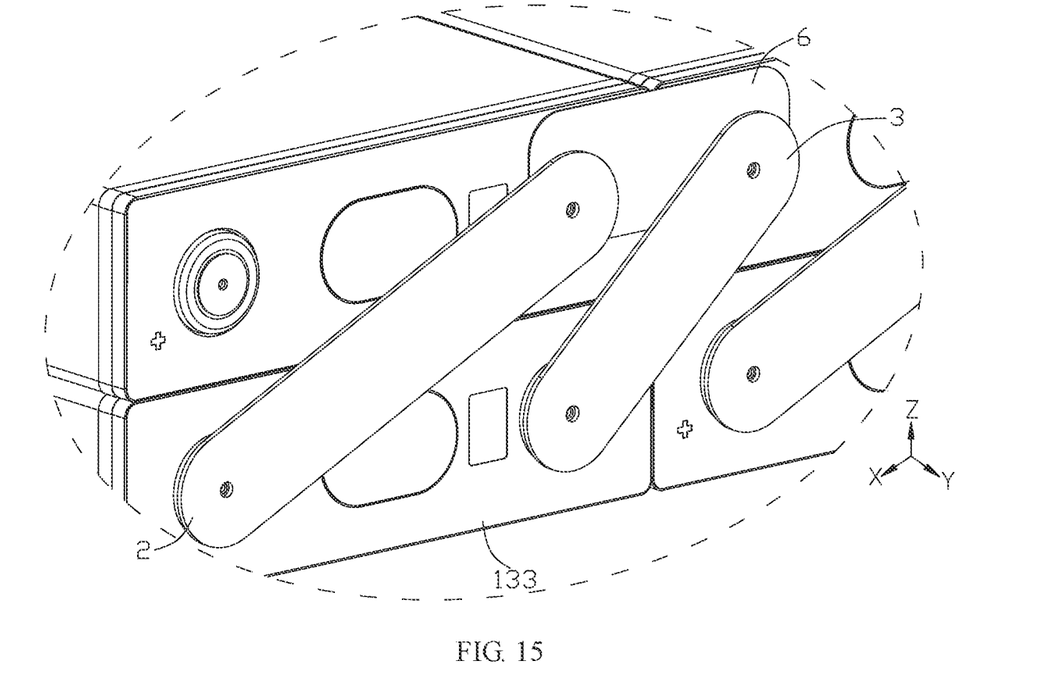
FIG. 15 is a locally enlarged view of part VI in FIG. 13.

In another specific embodiment, as shown in FIGS. 13 to 15, the conductive component 6 is connected to the electrode terminals 131. Specifically, when the failed battery cell 133 is located in the uppermost battery cell arrangement structure 1, the conductive component 6 can be directly connected to the electrode terminals 131 of the failed battery cell 133. As shown in FIG. 14, the positive electrode terminal 131a of the failed battery cell 133 is connected to the first adapting piece 2, and the negative electrode terminal 131b of the failed battery cell 133 is connected to the second adapting piece 3. Therefore, when the conductive component 6 is directly connected to the positive electrode terminal 131a and the negative electrode terminal 131b, along the width direction Y, at least part of the conductive component 6 is located between the two adapting pieces and the top cover plate 134 of the failed battery cell 133, thereby capable of connecting to the positive electrode terminal 131a and the negative electrode terminal 131b.

When the failed battery cell 133 is located in a lower battery cell arrangement structure 1, the failed battery cell 133 is located below the second upper end surface 521 of the mounting beam 52, and it is not easy to directly connect the conductive component 6 to the failed battery cell 133. The positive electrode terminal 131a of the failed battery cell 133 is connected to the first adapting piece 2, the negative electrode terminal 131b of the failed battery cell 133 is connected to the second adapting piece 3. In addition, the first adapting piece 2 is also connected to a battery cell 11 located on the upper layer, the second adapting piece 3 is also connected to a battery cell 11 located on the upper layer. Therefore, the conductive component 6 can also be connected to the electrode terminal 131 that is located on the upper layer and connected to the first adapting piece 2 and the electrode terminal 131 that is located on the upper layer and connected to the second adapting piece 3, so as to indirectly connect the electrode terminals 131 of the failed battery cell 133.

Figure 16:
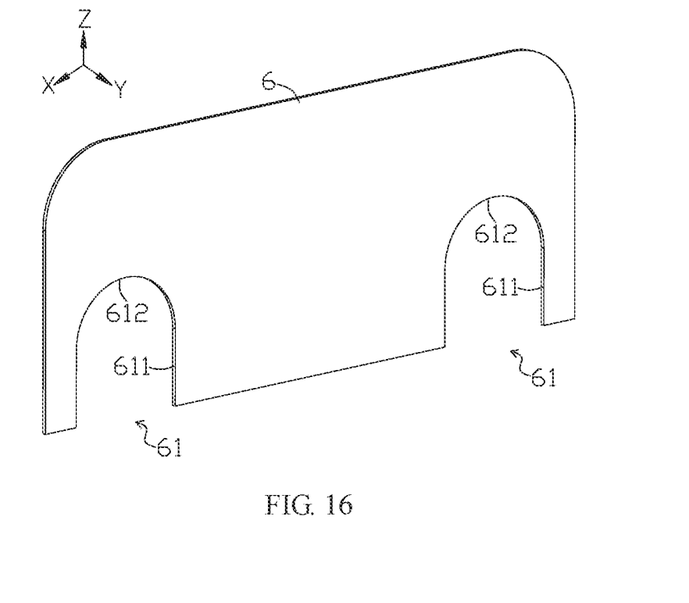
FIG. 16 is a schematic structural diagram of a conductive component.

Specifically, when the conductive component 6 is connected to the electrode terminals 131, they may be connected by welding. Certainly, they may alternatively be connected by another structure. For example, as shown in FIG. 16, the conductive component 6 includes two spaced matching slots 61 along a length direction X. A distance between the two matching slots 61 is equal to a distance between the two electrode terminals 131 connected to the conductive component 6. Using FIG. 14 as an example, when the conductive component 6 is connected to the positive electrode terminal 131a and the negative electrode terminal 131b of the failed battery cell 133, at least part of each of the two electrode terminals 131 is located in a corresponding matching slot 61, thereby connecting the conductive component 6 to the electrode terminals 131.

More specifically, along the height direction Z, the matching slot 61 includes a downward opening, and also includes a top wall 612 of the opening. Moreover, along the length direction X, the matching slot 61 includes two opposite side walls 611. When at least part of an electrode terminal 131 is located in the matching slot 61, the electrode terminal 131 abuts against the top wall 612, and the electrode terminal 131 also abuts against the two side walls 611, so that the electrode terminal 131 and the matching slot 61 are adapted to improve reliability of the connection between the conductive component 6 and the electrode terminal 131.

In addition, the conductive component 6 may alternatively be welded to the corresponding electrode terminal 131, or may be electrically connected by a conductive adhesive.

Figure 3:
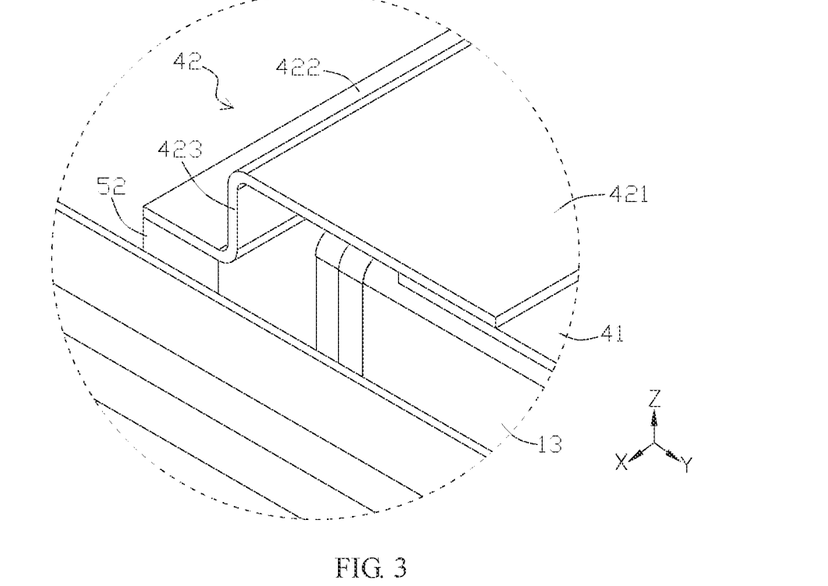
FIG. 3 is a locally enlarged view of part I in FIG. 2.

In a specific embodiment, as shown in FIG. 3 and FIG. 11, the pressing plate 4 may include a body part 41 and a connecting part 42. The body part 41 is located at an end of the battery cell arrangement structure 1 along the height direction Z. One end of the connecting part 42 is connected to the body part 41, and the other end of the connecting part 42 is detachably connected to the mounting beam 52, thereby connecting the pressing plate 4 to the mounting beam 52.

It should be noted that in this embodiment, along the height direction Z, the connecting part 42 of the pressing plate 4 and the mounting beam 52 may be directly connected, or a rubber pad may also be included between the two, which means that the connecting part 42 may be connected to the mounting beam 52 by using the rubber pad. Therefore, as the battery module M vibrates, the rubber pad can cushion the vibration between the connecting part 42 and the mounting beam 52, improving reliability of the connection between the pressing plate 4 and the mounting beam 52.

In addition, when the connecting part 42 of the pressing plate 4 is detachably connected to the mounting beam 52, not only the pressing plate 4 can be mounted on the mounting beam 52 to improve stability of the battery cells 13 in the accommodation cavity 51, but also the connecting part 42 can be easily removed from the mounting beam 52. In this way, at least part of the first adapting piece 2 and part of the second adapting piece 3 can be exposed from the mounting beam 52, to allow connecting the conductive component 6 to the first adapting piece 2 and the second adapting piece 3. Moreover, when the body part 41 of the pressing plate 4 is fixedly connected (for example, bonded) to the battery cells 13, the connecting part 42 detachably connected to the mounting beam 52 can be easily removed, thereby facilitating to connect the conductive component 6 to the first adapting piece 2 and the second adapting piece 3.

Specifically, as shown in FIG. 11 and FIG. 12, along the height direction Z, the battery cell 13 in the uppermost layer includes a first upper end surface 132, and the body part 41 is connected to the first upper end surface 132, where the two may be bonded by a structural adhesive, or connected by other means. Moreover, along the height direction Z, the mounting beam 52 includes a second upper end surface 521, and the first upper end surface 132 is higher than the second upper end surface 521, that is, the first upper end surface 132 is located above the second upper end surface 521.

In the embodiment shown in FIG. 11, the first connecting section 421 may be connected to the upper end surface of the body part 41 to increase a contact area between the two. The first connection section 421 may overlap the top of the body part 41. The first connection section 421 may be fixedly connected to the body part 41 by using screws, or the two may alternatively be connected by using a structural adhesive or by other means. In addition, the second connecting section 422 is detachably connected to the second upper end surface 521 of the mounting beam 52, and the two may specifically be fastened by using bolts.

In the embodiment shown in FIG. 12, the connecting part 42 may further include a pressing block 424, and the pressing block 424 is connected to a lower portion of the first connecting section 421. The thickness of the pressing block 424 along the height direction Z is the same as the thickness of the body part 41. When the first connecting section 421 is overlapped with the body part 41, the pressing block 424 can abut against the first upper end surface 132 of the battery cell 13, that is, the first connecting section 421 is connected to the body part 41 and the first upper end surface 132. Moreover, the second connecting section 422 is detachably connected to the second upper end surface 521 of the mounting beam 52. In this embodiment, connection reliability is high between the connecting part 42 and the battery cells 13 and between the connecting part 42 and the body part 41.

In the foregoing embodiments, the pressing plate 4 may include two connecting parts 42. The two connecting parts 42 are connected to two sides of the body part 41 along the width direction Y, so that the two sides of the pressing plate 4 along the width direction Y are connected to the mounting beam 52.

The first connecting section 421 is overlapped with the body part 41, and an overlapped length of the two is 10 mm to 200 mm. For example, the overlapped length may be 150 mm, 180 mm, or the like, and when the overlapped length of the two is long, connection reliability between the connecting part 42 and the body part 41 is high.

Furthermore, when along the width direction Y, the battery module M includes one battery cell arrangement structure 1, the body part 41 is within the battery cell arrangement structure 1 along the width direction Y, so that the body part 41 does not interfere with the conductive component 6 connecting to the first adapting piece 2 and the second adapting piece 3. Alternatively, in the embodiment shown in FIG. 10, when along the width direction Y, the battery module M includes two battery cell arrangement structures 1, along the width direction Y, one end of the body part 41 is within one battery cell arrangement structure 11, and the other end of the body part 41 is within the other battery cell arrangement structure 12, which means that a width of the body part 41 is less that a sum of the widths of the two battery cell arrangement structures 1.

In this embodiment, even if the body part 41 is not removed from the pressing plate 4, the body part 41 does not interfere with the conductive component 6 connecting to the first adapting piece 2 and the second adapting piece 3.

Figure 8:
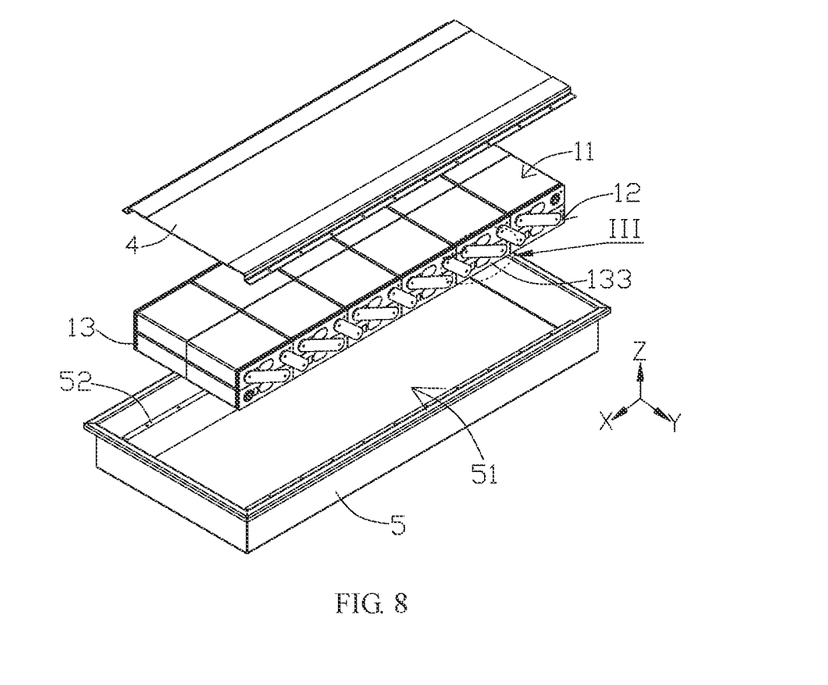
FIG. 8 is an exploded view of FIG. 2, where a first adapting piece and a second adapting piece are connected by using a conductive component.

In addition, in the embodiments shown in FIG. 8 and FIG. 9, along the height direction Z, the battery module M includes at least two layers of battery cell arrangement structures 1, namely, the first battery cell arrangement structure 11 and the second battery cell arrangement structure 12, and along the height direction Z, the first battery cell arrangement structure 11 is located above the second battery cell arrangement structure 12. The first adapting piece 2 connects a battery cell 13 of the first battery cell arrangement structure 11 and a battery cell 13 of the second battery cell arrangement structure 12, and the second adapting piece 3 connects a battery cell 13 of the first battery cell arrangement structure 11 and a battery cell 13 of the second battery cell arrangement structure 12. To be specific, battery cells 13 of the first battery cell arrangement structure 11 and battery cells 13 of the second battery cell arrangement structure 12 are connected in series by using the first adapting pieces 2 and the second adapting pieces 3, so that the first adapting pieces 2 and the second adapting pieces 3 are arranged obliquely along the height direction Z.

In this embodiment, in this connection manner, for the first adapting piece 2 and the second adapting piece 3 that are connected to the battery cells 13 of the second battery cell arrangement structure 12 in the lower layer, at least part of the first adapting piece 2 and part of the second adapting piece 3 are located above the second upper end surface 521 of the mounting beam 52, so that the first adapting piece 2 and the second adapting piece 3 can be connected by using the conductive component 6. To be specific, in this connection manner, the battery module M includes two layers of battery cell arrangement structures 1. When a battery cell 13 of the second battery cell arrangement structure 12 in the lower layer fails, the failed battery cell 133 (located in the lower layer) can also be connected by using the conductive component 6, so that the failed battery cell 133 can still be maintained without removing the battery cell arrangement structure 1.

In addition, an embodiment of this application further provides a failure handling method for a failed battery cell 133. The failure handling method includes the following steps.

S1: Remove at least part of a pressing plate 4 from the mounting beam 52.

In this step, after at least part of the pressing plate 4 is removed, at least part of the failed battery cell 131 is exposed, which can facilitate to accordingly perform an operation on the failed battery cell 133.

S2: Electrically connect the positive electrode terminal 131a and the negative electrode terminal 131b of the failed battery cell 133 by using a conductive component 6, where the conductive component 6 may be directly connected to the positive electrode terminal 131a and the negative electrode terminal 131b, or may be indirectly connected to the positive electrode terminal 131a and the negative electrode terminal 131b (for example, by using a first adapting piece 2 and a second adapting piece 3).

The conductive component 6 specifically may be a metal sheet or another structure, so as to implement a short circuit between the positive electrode terminal 131a and the negative electrode terminal 131b, and a cross-sectional area of the conductive component 6 should meet a current flowing requirement of the battery module M, thereby avoiding overheating at the conductive component 6.

Specifically, as described above, the pressing plate 4 may include the body part 41 and the connecting part 42 which are connected. In the pressing plate 4, the body part 41 is connected to a battery cell arrangement structure 1, the connecting part 42 is connected to the mounting beam, and therefore, the above step S1 may specifically be:

S11: Remove the connecting part 42 from the mounting beam 52.

In this embodiment, the connecting part 42 is detachably connected to the mounting beam 52 and the body part 41. In maintenance of a failed battery cell 133, there is no need to remove the entire pressing plate 4. At least part of the failed battery cell 133 can be exposed by only removing the connecting part 42, and therefore, the failed battery cell 133 can be easily maintained.

More specifically, two electrode terminals 131 of the failed battery cell 133 are connected to the first adapting piece 2 and the second adapting piece 3 respectively, and therefore, the above step S2 may specifically be:

S21: Electrically connect, by using the conductive component 6, the first adapting piece 2 and the second adapting piece 3 that are connected to the failed battery cell 133.

In this embodiment, two electrode terminals 131 of the failed battery cell 133 are indirectly connected by using the conductive component 6, so that the failed battery cell 133 is short-circuited. In addition, when the conductive component 6 is connected to the two adapting pieces, a contact area between the conductive component 6 and an adapting piece is relatively large, so that a current flowing area between the two can be increased, and a risk of overheating at the connection locations between the conductive component and the adapting pieces can be reduced.

In addition, the conductive component 6 may be specifically connected to the two adapting pieces by welding, or may be connected by bonding, riveting and other means.

More specifically, after the step S2, the failure handling method may further include:

S3: Mount the at least part of the pressing plate 4 that was removed from the mounting beam 52 back to the mounting beam 52.

When the at least part of the pressing plate 4 that was removed from the mounting beam 52 in the step S1 is the connecting part 42, the step S3 specifically may be:

S31: Mount the connecting part 42 that was removed from the mounting beam 52 back to the mounting beam 52.

In this step, after the removed connecting part 42 is re-mounted to the mounting beam 52, the maintenance of the failed battery cell 133 is completed. In the battery module M, the battery cell arrangement structure(s) 1 may also be limited by the pressing plate 4 and the mounting beam 52.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A battery module, wherein the battery module comprises:
   a battery cell arrangement structure, comprising a plurality of battery cells arranged along a length direction of the battery module, wherein the battery cells comprise electrode terminals that are arranged along the length direction, and face toward a width direction of the battery module, and the battery cells comprise a failed battery cell;
   a box body, wherein the box body comprises an accommodation cavity, and the battery cell arrangement structure is located in the accommodation cavity;
   a mounting beam, wherein the mounting beam is located in the accommodation cavity and at an end of the battery cell arrangement structure along the width direction, and along a height direction of the battery module, the mounting beam comprises a second upper end surface;
   a pressing plate, wherein at least part of the pressing plate is located at an end of the battery cell arrangement structure along the height direction, and the pressing plate is detachably connected to the mounting beam; and
   a conductive component, wherein the conductive component is connected to a positive electrode terminal and a negative electrode terminal of the failed battery cell;
   wherein, along the height direction, at least part of the conductive component is located between the second upper end surface and an uppermost portion of the pressing plate;
   wherein the battery module further comprises a first adapting piece and a second adapting piece, and the first adapting piece and the second adapting piece are electrically connected to the electrode terminals of the battery cells;
   the conductive component is electrically connected to the first adapting piece and the second adapting piece that are electrically connected to the failed battery cell; and
   along the height direction, at least part of the first adapting piece and part of the second adapting piece are located between the second upper end surface and the uppermost portion of the pressing plate;
   wherein along the height direction, a location for connecting the conductive component and the first adapting piece is between the second upper end surface and the pressing plate, and a location for connecting the conductive component and the second adapting piece is between the second upper end surface and the uppermost portion of the pressing plate;
   wherein the battery cell arrangement structure comprises a first battery cell arrangement structure and a second battery cell arrangement structure, and along the height direction, the first battery cell arrangement structure is located above the second battery cell arrangement structure; and
   the first adapting piece connects a battery cell of the first battery cell arrangement structure and a battery cell in the column adjacent to the battery cell of the first battery cell arrangement structure in the second battery cell arrangement structure, and the second adapting piece connects a battery cell of the first battery cell arrangement structure and a battery cell in the same column as the battery cell of the first battery cell arrangement structure in the second battery cell arrangement structure.

2. The battery module according to claim 1, wherein the pressing plate comprises a body part and a connecting part, and the body part is located at an end of the battery cell arrangement structure along the height direction; and
   one end of the connecting part is connected to the body part, and the other end of the connecting part is detachably connected to the mounting beam.

3. The battery module according to claim 2, wherein along the height direction, the battery cell on the uppermost layer comprises a first upper end surface, and the body part is connected to the first upper end surface;
   the first upper end surface is higher than the second upper end surface;
   the connecting part comprises a first connecting section, a second connecting section and a transition section, and the transition section connects the first connecting section and the second connecting section;

the first connecting section is connected to the body part, or the first connecting section is connected to the body part and the first upper end surface; and the second connecting section is detachably connected to the second upper end surface.

4. The battery module according to claim 1, wherein the battery cell comprises a top cover plate, and the electrode terminals are disposed on the top cover plate;

along the width direction, there is a preset distance between the top cover plate and the mounting beam; and when the pressing plate is connected to the mounting beam, the box body, the mounting beam, and the pressing plate enclose an accommodation space, and the conductive component is located in the accommodation space.

5. The battery module according to claim 3, wherein the body part is bonded to the first upper end surface; and the first connecting section is overlapped with the body part, and an overlapped length of the two is 10 mm to 200 mm.

6. A device, using battery cells as a power supply, wherein the apparatus comprises:

a power source, the power source being configured to provide driving force for the apparatus; and, the battery module according to claim 1, configured to supply electric energy to the power source.

7. A failure handling method for a failed battery cell within a battery module, wherein the battery module comprises:

a battery cell arrangement structure, comprising a plurality of battery cells arranged along a length direction of the battery module, wherein the battery cells comprise electrode terminals that are arranged along the length direction, and face toward a width direction of the battery module, and the battery cells comprise the failed battery cell;

a box body, wherein the box body comprises an accommodation cavity, and the battery cell arrangement structure is located in the accommodation cavity;

a mounting beam, wherein the mounting beam is located in the accommodation cavity and at an end of the battery cell arrangement structure along the width direction, and along a height direction of the battery module, the mounting beam comprises a second upper end surface;

a pressing plate, wherein at least part of the pressing plate is located at an end of the battery cell arrangement structure along the height direction, and the pressing plate is detachably connected to the mounting beam; and a conductive component, wherein the conductive component is connected to a positive electrode terminal and a negative electrode terminal of the failed battery cell;

wherein, along the height direction, at least part of the conductive component is located between the second upper end surface and an uppermost portion of the pressing plate;

wherein the battery module further comprises a first adapting piece and a second adapting piece, and the first adapting piece and the second adapting piece are electrically connected to the electrode terminals of the battery cells;

wherein the conductive component is electrically connected to the first adapting piece and the second adapting piece that are electrically connected to the failed battery cell;

wherein along the height direction, at least part of the first adapting piece and part of the second adapting piece are located between the second upper end surface and the uppermost portion of the pressing plate;

wherein along the height direction, a location for connecting the conductive component and the first adapting piece is between the second upper end surface and the pressing plate, and a location for connecting the conductive component and the second adapting piece is between the second upper end surface and the uppermost portion of the pressing plate;

wherein the battery cell arrangement structure comprises a first battery cell arrangement structure and a second battery cell arrangement structure, and along the height direction, the first battery cell arrangement structure is located above the second battery cell arrangement structure; and the first adapting piece connects a battery cell of the first battery cell arrangement structure and a battery cell in the column adjacent to the battery cell of the first battery cell arrangement structure in the second battery cell arrangement structure, and the second adapting piece connects a battery cell of the first battery cell arrangement structure and a battery cell in the same column as the battery cell of the first battery cell arrangement structure in the second battery cell arrangement structure, wherein the failure handling method comprises:

removing at least part of the pressing plate from the mounting beam; and electrically connecting the positive electrode terminal and the negative electrode terminal of the failed battery cell by using the conductive component.

8. The failure handling method according to claim 7, wherein the pressing plate comprises a body part and a connecting part, and when at least part of the pressing plate is to be removed from the mounting beam, the failure handling method comprises:

removing the connecting part from the mounting beam.

9. The failure handling method according to claim 7, wherein two electrode terminals of the failed battery cell are electrically connected to the first adapting piece and the second adapting piece respectively, and when the positive electrode terminal and the negative electrode terminal of the failed battery cell are to be connected by using the conductive component, the failure handling method comprises:

electrically connecting, by using the conductive component, the first adapting piece and the second adapting piece that are electrically connected to the failed battery cell.

10. The failure handling method according to claim 7, wherein after the positive electrode terminal and the negative electrode terminal of the failed battery cell are electrically connected by using the conductive component, the failure handling method further comprises:

mounting the at least part of the pressing plate that was removed from the mounting beam back to the mounting beam.

* * * * *